(No Model.)
H. W. FLEMING.
Rock Drill.
No. 231,785.  Patented Aug. 31, 1880.
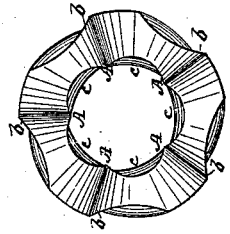
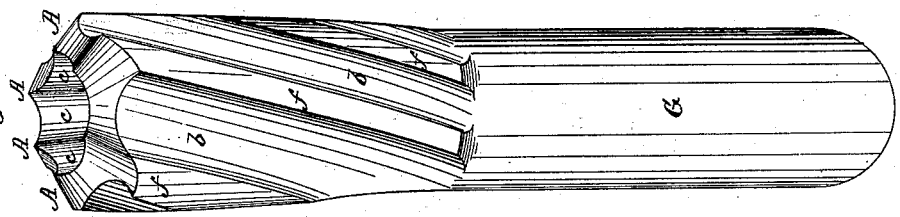
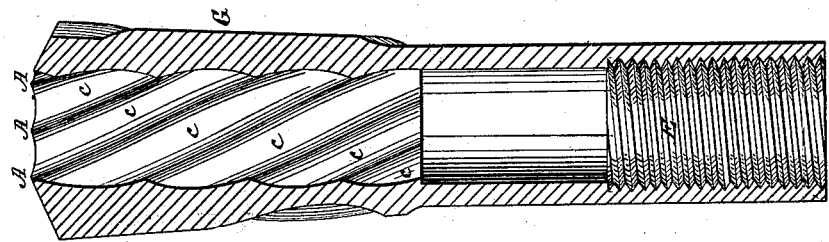
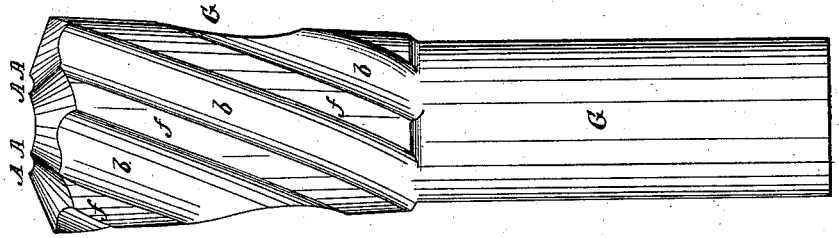
WITNESSES:
W. W. Hollingsworth
John C. Kernon
INVENTOR:
H. W. Fleming
BY 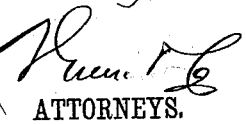
ATTORNEYS.
N. PETERS, PHOTO-LITHOGRAPHER, WASHINGTON, D. C.

UNITED STATES PATENT OFFICE.

HENRY W. FLEMING, OF DENVER, COLORADO, ASSIGNOR OF ONE-HALF OF HIS RIGHT TO WILLIAM C. WILLIAMS AND CRAFTS W. HIGGINS, OF SAME PLACE, ONE-FOURTH TO EACH.

ROCK-DRILL.

SPECIFICATION forming part of Letters Patent No. 231,785, dated August 31, 1880.

Application filed March 23, 1880. (No model.)

*To all whom it may concern:*

Be it known that I, HENRY W. FLEMING, of Denver, in the county of Arapahoe and State of Colorado, have invented a new and useful Improvement in Rock-Drills, which improvement is fully set forth in the following specification, reference being had to the accompanying drawings.

The object of my invention is to make a drill which will bring out a solid core of rock from any desired depth at which it is practicable to drill or bore.

The tubular drill is provided with inner and outer grooves for the passage of sediment and water, as hereinafter explained.

In accompanying drawings, Figure 1 is a side view, and Fig. 2 a central longitudinal section, of the drill. Fig. 3 is a perspective view, and Fig. 4 an end view, of the same.

A A indicate the angular cutters formed on the beveled end of the tubular drill G. $b\ b$ are the exterior spiral grooves, separated by plain-faced ribs $f$, and $c\ c$ are corresponding interior spiral grooves which are separated by narrow sharp-edged ribs.

In the operation of drilling the cutting end A of the drill G cuts an annular recess or cavity, leaving a solid core or cylinder of rock, which enters the base of the drill.

The function of the outer grooves, $b$, is to convey upward the broken and pulverized rock or other sediment, while the inner grooves, $c\ c$, admit water required to force or carry up such sediment. The grooves $c$ also serve to hold the rock-core when detached or broken from its base.

The upper end of the drill has an internal screw-thread, E, which adapts it for convenient attachment to a drill stock or rod.

I do not claim a tubular drill; but

What I claim is—

1. A tubular rock-drill having inner and outer grooves, $c\ b$, for passage of water and sediment, respectively, as shown and described.

2. A tubular rock-drill having inner spiral grooves, $c$, which serve to hold the solid rock-core, as set forth

HENRY W. FLEMING.

Witnesses:
GEO. W. ANDERSON,
A. H. CONKLIN.